United States Patent
McNally et al.

(10) Patent No.: US 12,388,123 B2
(45) Date of Patent: Aug. 12, 2025

(54) METHODS OF RECOVERING ACTIVE MATERIALS FROM RECHARGEABLE BATTERIES, AND RELATED APPARATUSES

(71) Applicant: Battelle Energy Alliance, LLC, Idaho Falls, ID (US)

(72) Inventors: Joshua S. McNally, Idaho Falls, ID (US); Luis A. Diaz Aldana, Idaho Falls, ID (US); John R. Klaehn, Idaho Falls, ID (US); Tedd E. Lister, Bangor, ME (US); David W. Reed, Idaho Falls, ID (US)

(73) Assignee: Battelle Energy Alliance, LLC, Idaho Falls, ID (US)

(*) Notice: Subject to any disclaimer, the term of this patent is extended or adjusted under 35 U.S.C. 154(b) by 828 days.

(21) Appl. No.: 17/595,967

(22) PCT Filed: May 28, 2020

(86) PCT No.: PCT/US2020/070081
§ 371 (c)(1),
(2) Date: Nov. 30, 2021

(87) PCT Pub. No.: WO2020/252495
PCT Pub. Date: Dec. 17, 2020

(65) Prior Publication Data
US 2022/0223932 A1 Jul. 14, 2022

Related U.S. Application Data

(60) Provisional application No. 62/861,672, filed on Jun. 14, 2019.

(51) Int. Cl.
*H01M 10/54* (2006.01)
*C22B 3/00* (2006.01)
(Continued)

(52) U.S. Cl.
CPC ............ *H01M 10/54* (2013.01); *C22B 7/007* (2013.01); *C22B 23/0415* (2013.01);
(Continued)

(58) Field of Classification Search
CPC ...... H01M 4/505; H01M 4/525; H01M 10/54; H01M 10/0525; H01M 10/44; C22B 7/007; C22B 23/0415; C22B 26/12; C22B 26/22
See application file for complete search history.

(56) References Cited

U.S. PATENT DOCUMENTS 6,514,311 B1 * 2/2003 Lin .......................... C25C 1/12
205/582
7,192,564 B2   3/2007 Cardarelli et al.
(Continued)

FOREIGN PATENT DOCUMENTS

CN     104241724 A     12/2014
CN     106505225 A     3/2017
(Continued)

OTHER PUBLICATIONS

Lobos, "Bioleaching Potential of Filamentous Fungi to Mobilize Lithium and Cobalt from Spent Rechargeable Li-ion Batteries", Graduate Theses and Dissertations, Graduate School, University of South Florida Commons, (Oct. 31, 2017), 81 pages. (Year: 2017).*
(Continued)

*Primary Examiner* — Karie O'Neill Apicella
(74) *Attorney, Agent, or Firm* — TraskBritt

(57) ABSTRACT

A method of recovering active materials from a rechargeable battery comprises placing an active material of a rechargeable battery in a cathode chamber comprising a cathode of an electrochemical cell comprising the cathode chamber, an anode chamber comprising an anode, and a membrane separating the cathode chamber from the anode chamber,
(Continued)

contacting the active material in the cathode chamber with an electrolyte comprising an acid, ferric ions, and ferrous ions, and dissolving at least one of lithium and cobalt from the active material into the electrolyte. Related apparatuses for recovering metals from active materials of rechargeable batteries are also disclosed.

21 Claims, 4 Drawing Sheets

(51) Int. Cl.

| | | |
|---|---|---|
| C22B 7/00 | (2006.01) | |
| C22B 26/12 | (2006.01) | |
| C22B 26/22 | (2006.01) | |
| H01M 4/505 | (2010.01) | |
| H01M 4/525 | (2010.01) | |
| H01M 10/0525 | (2010.01) | |
| H01M 10/44 | (2006.01) | |

(52) U.S. Cl.
CPC .............. *C22B 26/12* (2013.01); *C22B 26/22* (2013.01); *H01M 4/505* (2013.01); *H01M 4/525* (2013.01); *H01M 10/0525* (2013.01); *H01M 10/44* (2013.01)

(56) References Cited

U.S. PATENT DOCUMENTS

| | | |
|---|---|---|
| 8,882,007 B1 | 11/2014 | Smith et al. |
| 2013/0287654 A1 | 10/2013 | Yamada et al. |
| 2017/0067135 A1 | 3/2017 | Lister et al. |
| 2017/0077564 A1 | 3/2017 | Wang et al. |
| 2018/0261894 A1 | 9/2018 | Wang et al. |
| 2019/0084839 A1* | 3/2019 | Ito .......................... C22B 7/007 |
| 2021/0230757 A1 | 7/2021 | Arimoto et al. |

FOREIGN PATENT DOCUMENTS

| | | |
|---|---|---|
| TW | 201809296 A | 3/2018 |
| WO | 2018/223193 A1 | 12/2018 |
| WO | 2018/227237 A1 | 12/2018 |

OTHER PUBLICATIONS

Xin et al., "Bioleaching mechanism of Co and Li from spent lithium-ion battery by mixed culture of acidophilic sulfur-oxidizing and iron-oxidizing bacteria", Bioresource Technology, vol. 100, (Jun. 2009), pp. 6163-6169. (Year: 2009).*
U.S. Appl. No. 62/713,702, filed Aug. 2, 2018, titled "Metal Sulfate Manufacturing System via Electrochemical Dissolution", to Arimoto et al., 20 pages.
International Search Report from International Application No. PCT/US2020/070081, mailed Aug. 18, 2020, 3 pages.
International Written Opinion from International Application No. PCT/US2020/070081, mailed Aug. 18, 2020, 7 pages.
Lobos, "Bioleaching Potential of Filamentous Fungi to Mobilize Lithium and Cobalt from Spent Rechargeable Li-Ion Batteries", Graduate Theses and Dissertations, Graduate School, University of South Florida Scholar Commons, (Oct. 31, 2017) 81 pages.
Ramachandran et al., "Gluconic Acid: A Review; Gluconic Acid: Properties, Applications and Microbial Production", Food Technol. Biotechnol., vol. 44, No. 2 (Mar. 2006) pp. 185-195.
Xin et al., "Bioleaching mechanism of Co and Li from spent lithium-ion battery by the mixed culture of acidophilic sulfur-oxidizing and iron-oxidizing bacteria", Bioresource Technology, vol. 100, (Jun. 2009) pp. 6163-6169.

* cited by examiner

METHODS OF RECOVERING ACTIVE MATERIALS FROM RECHARGEABLE BATTERIES, AND RELATED APPARATUSES

CROSS-REFERENCE TO RELATED APPLICATIONS

This application is a national phase entry under 35 U.S.C. § 371 of International Patent Application PCT/US2020/070081, filed May 28, 2020, designating the United States of America and published as International Patent Publication WO 2020/252495 A1 on Dec. 17, 2020, which claims the benefit under Article 8 of the Patent Cooperation Treaty to U.S. Provisional Patent Application Ser. No. 62/861,672, filed Jun. 14, 2019.

STATEMENT REGARDING FEDERALLY SPONSORED RESEARCH OR DEVELOPMENT

This invention was made with government support under Contract Number DE-AC07-05-ID14517 awarded by the United States Department of Energy. The government has certain rights in the invention.

TECHNICAL FIELD

Embodiments of the disclosure relate generally to methods of dissolving one or more active materials from waste rechargeable battery materials. More particularly, embodiments of the disclosure relate to methods of recovering active materials from rechargeable batteries, such as lithium-ion batteries and metal hydride batteries, using an electrochemical cell, and to related apparatuses for recovering the active materials.

BACKGROUND

Lithium-ion batteries (LIBs) are one of the most often used rechargeable batteries in consumer electronic devices, such as cellular phones, laptop computers, and video cameras. Lithium-ion batteries are known for their relatively light weight and associated high energy density, low self-discharge rate, high battery voltage, wide operating temperature range, and no memory effect, among other things, making them desirable candidates for use in such electronic devices. In addition to electronic devices, lithium-ion batteries are used in transportation, such as in hybrid and fully electric vehicles, portable tools, and in various military and aerospace applications. Lithium-ion batteries are also used to store electrical energy for later use within an electrical power grid. In addition to lithium-ion batteries, other types of rechargeable batteries, such as metal hydride batteries, are used in various electronic devices and equipment. Due to the increasing demand for electronic devices and equipment incorporating rechargeable batteries, the global production and consumption of rechargeable batteries have been rising.

A lithium-ion battery includes an anode, a cathode, electrolytes, a separator between the anode and the cathode, and an outer shell. The separator is made from polymeric materials and the outer shell is conventionally a steel or plastic material. The anode typically includes a composite of carbon powder and a binder (polymer), which is coated with copper foil. The cathode may include an active material comprising lithium cobalt oxide ($LiCoO_2$). Other lithium-ion batteries include active materials including other transition metals, such as one or both of nickel and manganese, to partially or completely substitute traditional cobalt to form different types of cathode materials. Thus, active cathode materials may include carbon powder, a polymer binder, and lithium transition metal oxides $LiCoO_2$, $LiMn_2O_3$, $LiNiO_2$, $LiNi_xCo_yMn_zO_2$ (LNCM) ($LiNi_{1/3}Co_{1/3}Mn_{1/3}O_2$), and NiCoAlO.

Other forms of rechargeable batteries include, for example, metal hydride batteries (e.g., nickel-metal hydride batteries). Metal hydride batteries include active materials comprising, for example, nickel oxide hydroxide (NiOOH) (also referred to as nickel oxyhydroxide), nickel oxide (NiO), nickel hydroxide ($Ni(OH)_2$), manganese tetraoxide ($Mn_3O_4$), magnesium oxide-hydroxide (MnO(OH)) (also referred to as manganite), cobalt oxide ($Co_2O_3$), or other materials.

After lithium-ion batteries and metal hydride batteries reach the end of their useful life (i.e., after the batteries are spent), they are disposed of Often, the batteries are disposed of by sending them to a landfill. However, disposal of such batteries in landfills leads to soil and groundwater contamination due to the presence of various materials present in the batteries. Since the batteries include metals, including cobalt, lithium, nickel, and manganese, various processes have been developed for the separation and subsequent recovery of the metals from spent batteries. Various methods include hydrometallurgical methods or pyrometallurgical methods. Pyrometallurgical methods require smelting the battery materials in a furnace to obtain a metal alloy. However, the smelting process generates and emits harmful gases.

Hydrometallurgical processes include dissolving the cathode materials of the batteries in an acid, such as citric acid, ascorbic acid, hydrochloric acid, sulfuric acid, or nitric acid. After the cathode materials are dissolved in the acid (leachate), dissolved metals in the leachate may be recovered. However, leaching of metals using such methods is difficult due to the inherent insolubility of cathode materials (e.g., Co(III)) in such solutions. Therefore, the methods require significant quantities of and strength of acid, which generate significant quantities of waste acid. In addition, some methods of leaching metals in lithium-ion batteries result in hazardous gas emissions ($Cl_2$, $SO_2$).

BRIEF SUMMARY

In accordance with one embodiment described herein, methods and apparatuses for recovering metals from active materials of rechargeable batteries, such as lithium-ion batteries or metal hydride batteries. For example, in some embodiments, a method of recovering active materials from a rechargeable battery comprises placing an active material of a rechargeable battery in a cathode chamber comprising a cathode of an electrochemical cell comprising the cathode chamber, an anode chamber comprising an anode, and a membrane separating the cathode chamber from the anode chamber, contacting the active material in the cathode chamber with an electrolyte comprising an acid, ferric ions, and ferrous ions, applying a potential between the anode and the cathode, and dissolving at least one of lithium and cobalt from the active material into the electrolyte.

In additional embodiments, an apparatus for recovering metals from active materials of rechargeable batteries comprises an electrochemical cell comprising an anode, a cathode, a membrane between the anode and the cathode, and an electrolyte. The electrolyte comprises an acid, ferric ions, ferrous ions, and an active material of a rechargeable battery. The apparatus further comprises a system for recovering at least one of lithium and cobalt from the electrolyte in operable communication with the electrochemical cell.

DETAILED DESCRIPTION

Figure 1A:
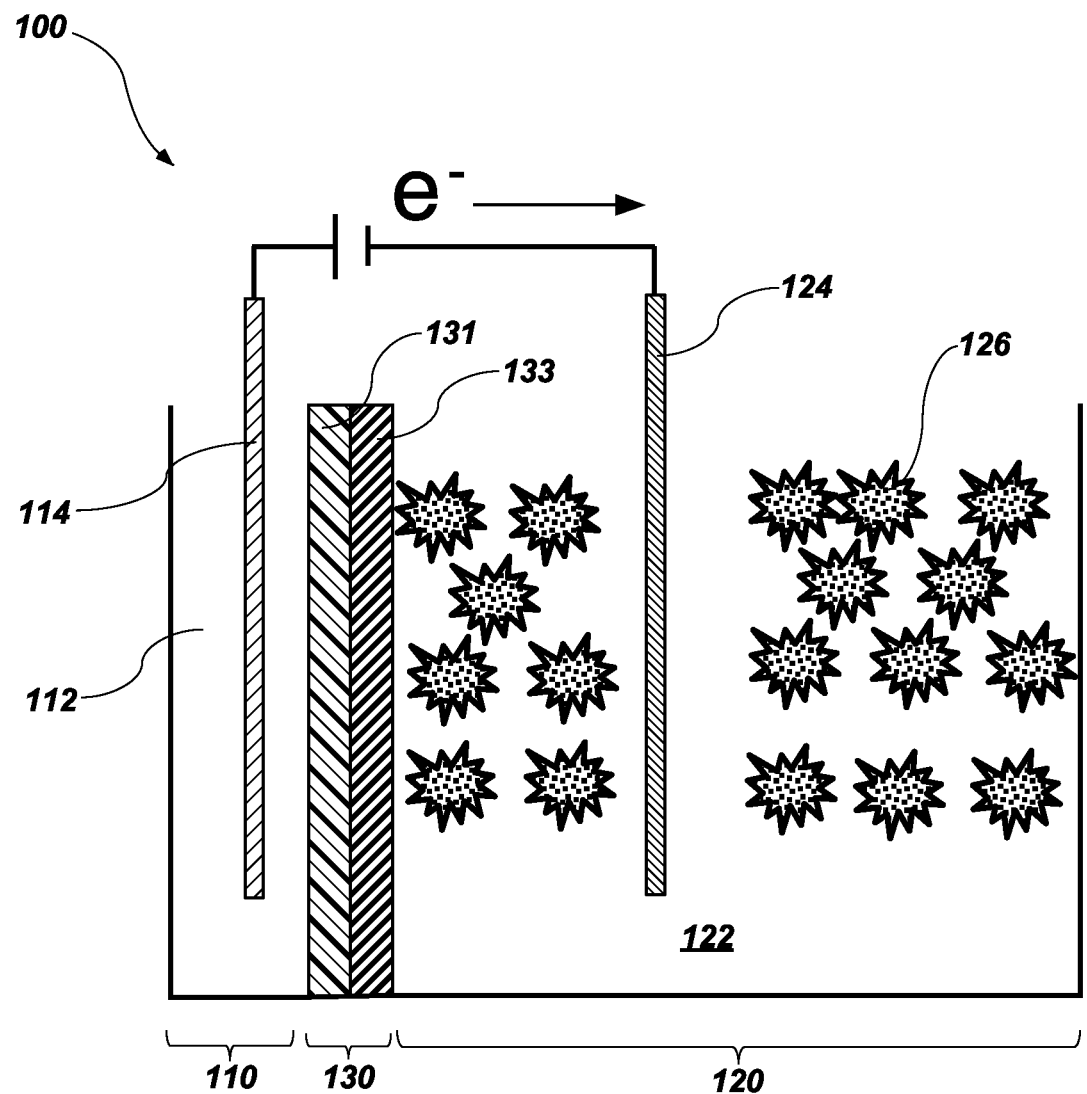
FIG. 1A is a simplified schematic of an electrochemical cell for removing active materials from rechargeable batteries, in accordance with embodiments of the disclosure.

The following description provides specific details, such as material types, dimensions, and processing conditions in order to provide a thorough description of embodiments of the disclosure. However, a person of ordinary skill in the art will understand that the embodiments of the disclosure may be practiced without employing these specific details. Indeed, the embodiments of the disclosure may be practiced in conjunction with conventional fabrication techniques employed in the industry. In addition, the description provided below does not form a complete process flow, apparatus, or system for recovering metals from a lithium-ion battery or from a metal hydride battery or of a reactor (e.g., a bioreactor) for forming gluconic acid. Only those process acts and structures necessary to understand the embodiments of the disclosure are described in detail below. Additional acts to remove metals from a lithium-ion battery or a metal hydride battery and recover the metals described herein may be performed by conventional techniques. Also note, any drawings accompanying the present application are for illustrative purposes only, and are thus not drawn to scale. Additionally, elements common between figures may retain the same numerical designation.

As used herein, a "battery active material" refers to materials within a battery (e.g., a rechargeable battery), such as a lithium-ion battery or a metal hydride battery, which materials are used to provide power. For example, a battery active material of a lithium-ion battery may include a compound formulated and configured to provide one or more of lithium ions, compounds including lithium, or ions including lithium within the lithium-ion battery. A battery active material of a metal hydride battery may include a component of the metal hydride battery formulated and configured to provide power such as, for example, one or more of a metal oxide hydroxide, a metal hydride, a metal oxide (e.g., a transition metal oxide), or a metal hydroxide (e.g., a transition metal hydroxide). The term "active material" is also used herein to refer to such materials and is used interchangeably with the term "battery active material." Active materials may include, for example, one or more of lithium cobalt ($LiCoO_2$), lithium manganese oxide ($LiMn_2O_3$), lithium nickel oxide ($LiNiO_2$), $LiNi_xCo_yMn_zO_2$ (LNCM), lithium-nickel-manganese-cobalt-aluminum oxide (($Li(NiCoAl)O_2$) (NCA)), nickel oxyhydroxide, nickel hydroxide, manganese tetraoxide, manganite (MnO(OH)), cobalt oxide, or another material. In some embodiments, active materials may also include rare earth-containing materials (e.g., rare earth ores, rare earth tailings, rare earth magnets), cobalt-containing magnets (e.g., samarium cobalt, aluminum-nickel-cobalt (AlNiCo) magnets), nickel cadmium (NiCd) batteries, fluid catalytic cracking (FCC) catalysts, phosphors, phosphogypsum (e.g., $CaSO_4.2H_2O$), phosphate clays, neodymium magnets, coal fly ash, materials of photovoltaic cells (e.g., indium, gallium, tellurium), or other materials including one or more metals.

According to embodiments described herein, a method of recovering metals (e.g., active materials) from a rechargeable battery (e.g., a lithium-ion battery, a metal hydride battery) includes leaching (e.g., by reductive leaching) the metals from the active battery material in an electrochemical cell. The electrochemical cell includes an anode chamber, a cathode chamber, and a membrane between the anode chamber and the cathode chamber. The cathode chamber may include an electrolyte comprising an acid and iron sulfate ($FeSO_4$) dissolved therein. The iron sulfate generates ferrous ions ($Fe^{2+}$) in the cathode chamber. The ferrous ions act as a reducing agent to reduce metals from the active battery materials, such as one or more of cobalt, nickel, and manganese from the active battery material (e.g., one or more of $LiCoO_2$, $LiMn_2O_3$, $LiNiO_2$, or $LiNi_xCo_yMn_zO_2$, $Li(NiCoAl)O_2$, nickel oxyhydroxide, nickel hydroxide, manganese tetraoxide, manganite (MnO(OH)), or cobalt oxide). The ferrous ions are, in turn, oxidized to ferric ($Fe^{3+}$). The metals from the active battery material are reduced by the ferrous ions, increasing the solubility of the metals in the electrolyte and generating a loaded electrolyte comprising dissolved active materials therein. The ferric ions are regenerated to ferrous ions at the cathode, facilitating continued reductive leaching of the metals of the active battery materials without requiring additional reducing agents. The membrane between the anode chamber and the cathode chamber facilitates transfer of protons ($H^+$) to the cathode chamber and transfer of hydroxide ions ($OH^-$) to the anode chamber. Hydroxide ions in the anode chamber react to generate water and electrons.

The metals dissolved in the electrolyte may be selectively recovered by flowing the loaded electrolyte through one or more metal recovery apparatuses formulated and configured to selectively recover one or more of the dissolved metals. For example, the loaded electrolyte may be flowed through one or more extraction stages to separate cobalt and manganese from nickel and lithium, such as with a solvent (e.g., an organic solvent). The cobalt may be separated from the manganese to selectively recover the cobalt and the manganese. The nickel may be separated from the lithium to selectively recover the nickel and the lithium. In some embodiments, aluminum, copper, or both may be recovered from the electrolyte. In some embodiments, one or more of the metals (e.g., cobalt, manganese, nickel, lithium) may be recovered by flowing the loaded electrolyte through an ion exchange resin formulated and configured to selectively adsorb the one or more metals. The electrolyte from which the dissolved metals have been substantially recovered may be recycled to the cathode chamber of the electrochemical cell where the electrolyte may be loaded with dissolved metals from the active material and the process may continue. Accordingly, one or more metals may be recovered from lithium-ion battery materials with the electrochemical cell.

In some embodiments, the acid of the electrolyte is generated organically and is, thus, renewable. For example, the acid of the electrolyte may be formed by an acid-generating bacteria that may produce one or more of gluconic acid, xylonic acid, citric acid, succinic acid, and acetic acid. The acid generating bacteria may metabolically generate the acid (e.g., gluconic acid) using glucose, corn stover, or another organic material as a feed material. The generated gluconic acid may be used in the electrochemical cell to dissolve the metals from the active battery materials. Thus, the metals may be removed from the active battery material with a renewable acid. Generation of the gluconic acid with the bacteria may reduce the environmental impact of the method of recovering the metals from the active battery materials. For example, since the acid (e.g., gluconic acid, xylonic acid, citric acid, succinic acid, and acetic acid) is an organic acid, the environmental impact of the acid may be reduced relative to leaching processes using a mineral acid.

FIG. 1A is a simplified schematic of an electrochemical cell 100 for removing active materials from rechargeable batteries, such as lithium ion batteries, metal hydride batteries, or both, in accordance with embodiments of the disclosure. The electrochemical cell 100 may be used for recovering at least some metals from which the cathode portion of lithium-ion batteries are formed, or from which the anode or cathode of metal hydride batteries are formed. The electrochemical cell 100 may include an anode chamber 110, a cathode chamber 120, and a membrane 130 between the anode chamber 110 and the cathode chamber 120.

The anode chamber 110 may include a first liquid 112 and an anode 114 at least partially submerged by the first liquid 112. In some embodiments, the first liquid 112 comprises water and includes one or more ions dissolved therein. The first liquid 112 may include hydroxide ions. The anode 114 may comprise a material suitable for conducting electricity and exhibiting a tolerance to aqueous solutions (e.g., water, hydroxide ions, etc.). In some embodiments, the anode 114 comprises one or more of carbon, stainless steel, and nickel. However, the disclosure is not so limited and the anode 114 may comprise one or more materials other than, or in addition to, those described. The cathode 124 may include a material suitable for conducting electricity and exhibiting a tolerance to the electrolyte 122. In some embodiments, the cathode 124 comprises stainless steel.

The membrane 130 may comprise a bipolar membrane, a proton-exchange membrane (PEM), or another membrane formulated and configured to allow passage of protons therefrom while substantially electrically insulating the anode chamber 110 from the cathode chamber 120. In some embodiments, the membrane 130 is substantially impermeable to ferric ions, ferrous ions, and metal cations such as ions of one or more of lithium, cobalt, manganese, nickel, aluminum, copper, or another metal. In some embodiments, the membrane 130 comprises a bipolar membrane. In some such embodiments, the membrane 130 comprises an anion exchange layer 131 on the side of the anode chamber 110 and a cation exchange layer 133 on the side of the cathode chamber 120.

The cathode chamber 120 may include an electrolyte 122 and a cathode 124 at least partially submerged within the electrolyte 122. The electrolyte 122 may include active materials 126 collected from lithium-ion batteries, metal hydride batteries, or active materials from other rechargeable batteries. The active materials 126 may include one or more of lithium, cobalt, nickel, manganese, or aluminum. For example, the active materials 126 may comprise one or more of $LiCoO_2$, $LiMn_2O_3$, $LiNiO_2$, or $LiNi_xCo_yMn_zO_2$, $Li(NiCoAl)O_2$, nickel oxyhydroxide, nickel hydroxide, manganese tetraoxide, manganese oxide-hydroxide (manganite; (MnO(OH))), or cobalt oxide. In some embodiments, the active materials 126 comprise $LiCoO_2$. In some embodiments, the active material 126 further includes one or more of aluminum, nickel, and manganese. The active material 126 may comprise a composite material including battery active materials from lithium-ion batteries, metal hydride batteries, or other rechargeable batteries. In some embodiments, the active material 126 may be substantially free of polymer materials, binder materials, graphite, battery electrolytes, or other components that may comprise a portion of rechargeable batteries but do not constitute the active materials. In other embodiments, the active material 126 comprises a cake or powder including the active battery materials and further including, for example, graphite powder. In some embodiments, the active material 126 includes a composite material comprising graphite and one or more of lithium, cobalt, nickel, manganese, aluminum, or copper (which may be present in the current collector of the anode materials of lithium-ion batteries).

In addition to the active materials 126, the electrolyte 122 may include ferric ions and ferrous ions dissolved therein. By way of nonlimiting example, iron sulfate ($FeSO_4$) may be dissolved within the electrolyte 122 to provide ferrous ions. As will be described herein, the ferric ions may reduce at least some of the metals of the active material 126 to solubilize the metals of the active material 126 and to generate ferric ions. A concentration of the ferric ions and the ferrous ions within the electrolyte 122 may be within a range from about 0.005 M to about 0.10 M, such as from about 0.005 M to about 0.01 M, from about 0.01 M to about 0.02 M, from about 0.02 M to about 0.03 M, from about 0.03 M to about 0.05 M, from about 0.05 M to about 0.075 M, or from about 0.075 M to about 0.10 M. However, the disclosure is not so limited, and the concentration of the iron sulfate in the electrolyte 122 may be different.

The electrolyte 122 may comprise an acid in which the ferric ions and the ferrous ions are dissolved to form an aqueous solution. In some embodiments, electrolyte 122 may comprise a mineral acid, such as one or more of sulfuric acid, hydrochloric acid, phosphoric acid, nitric acid, gluconic acid ($C_6H_{12}O_7$), and an organic acid (e.g., one or more of xylonic acid ($C_5H_{10}O_6$), citric acid ($C_6H_8O_7$), succinic acid ($C_4H_6O_4$), and acetic acid ($CH_3COOH$)). In some embodiments, the electrolyte 122 comprises sulfuric acid. In some embodiments, the electrolyte 122 comprises an organic acid, such as gluconic acid. In some embodiments, the electrolyte 122 comprises gluconic acid and xylonic acid. In some embodiments, the electrolyte 122 comprises gluconic acid, xylonic acid, citric acid, succinic acid, and acetic acid. The acid may have a concentration within a range from about 0.1 M to about 5.0 M, such as from about 0.1 M to about 0.2 M, from about 0.2 M to about 0.5 M, from about 0.5 M to about 1.0 M, from about 1.0 M to about 2.0 M, from about 2.0 M to about 3.0 M, from about 3.0 M to about 4.0 M, or from about 4.0 M to about 5.0 M. The pH of the electrolyte 122 may be within a range from about less than about 0.0 to about 4.0, such as from about 0.0 to about 0.5, from about 0.5 to about 1.0, from about 1.0 to about 1.5, from about 1.5 to about 2.0, from about 2.0 to about 2.5, from about 2.5 to about 3.0, from about 3.0 to about 3.5, or from about 3.5 to about 4.0. In some embodiments, the pH of the electrolyte 122 is within a range from about 2.0 to about 2.3.

In some embodiments, the electrolyte 122 is formed by dissolving iron sulfate in a solution comprising one or both of sulfuric acid and gluconic acid. The active materials 126 are added to the electrolyte 122. In some embodiments, pH of the electrolyte 122 is maintained by addition of the active materials 126 to the electrolyte 122. For example, in some embodiments, addition of the active materials 126 may increase the pH of the electrolyte 122. In use and operation, protons are consumed during dissolution of the metals from the active material 126. Accordingly, the pH of the electrolyte 122 may increase during use and operation. A pH of the electrolyte 122 may be maintained less than about 4.0, such as less than about 3.0, or less than about 2.0. In some embodiments, the pH of the electrolyte 122 may be decreased by addition of the acid. For example, a pump and a pH controller may be coupled to the electrochemical cell 100 to control the pH of the electrolyte 122.

In use and operation, a voltage may be applied between the anode 114 and the cathode 124. In some embodiments, a controlled potential may be applied over the cathode 124 using a reference electrode, such as, for example, Ag/AgCl at −0.3 V. The voltage may be within a range from about 1.0 V to about 5.0 V, such as from about 1.0 V to about 1.5 V, from about 1.5 V to about 2.0 V, from about 2.0 V to about 2.5 V, from about 2.5 V to about 3.0 V, from about 3.0 V to about 3.5 V, from about 3.5 V to about 4.0 V, from about 4.0 V to about 4.5 V, or from about 4.5 V to about 5.0 V. However, the disclosure is not so limited and different potentials may be applied between the anode 114 and the cathode 124. In some embodiments, the potential between the anode 114 and the cathode 124 is maintained substantially constant to reduce evolution of hydrogen gas from the electrochemical cell 100. In some embodiments, the potential between the anode 114 and the cathode 124 may be below a range at which copper would be removed from the active materials 126. In some such embodiments, copper may be separated from other metals located within the active materials 126.

A current between the anode 114 and the cathode 124 may be between about 0.5 A and about 1.0 A. However, the disclosure is not so limited and the current between the anode 114 and the cathode 124 may be different than that described above. The maximum current may depend, at least in part, on the size of the anode 114 and the cathode 124. The current may decrease during extraction of the metals from the active materials 126.

Hydroxide ions may react to form water in the anode chamber 110 according to Equation (1) below:

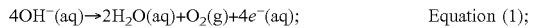
$$4OH^-(aq) \rightarrow 2H_2O(aq) + O_2(g) + 4e^-(aq);$$    Equation (1);

The electrons generated in the anode chamber 110 may be transferred to the cathode chamber 120. In the cathode chamber 120, metals of the active materials 126 may be reduced according to Equation (2) below:

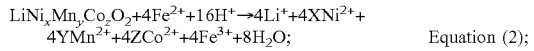
$$LiNi_xMn_yCo_zO_2 + 4Fe^{2+} + 16H^+ \rightarrow 4Li^+ + 4XNi^{2+} + 4YMn^{2+} + 4ZCo^{2+} + 4Fe^{3+} + 8H_2O;$$    Equation (2);

wherein X+Y+Z is equal to about 1.0 and the ions are in the aqueous phase and the $LiNi_xMn_yCo_zO_2$ is a solid. In some embodiments, one or more of X, Y, or Z is equal to 0 and the active material 126 comprises, for example, $LiCoO_2$, $LiMn_2O_3$, or $LiNiO_2$. Of course, where the active material 126 has a different composition, Equation (2) may be different than described above. The overall reaction for the electrochemical cell 100 is shown in Equation (3) below:

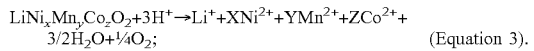
$$LiNi_xMn_yCo_zO_2 + 3H^+ \rightarrow Li^+ + XNi^{2+} + YMn^{2+} + ZCo^{2+} + 3/2H_2O + \tfrac{1}{4}O_2;$$    (Equation 3).

The generated ferric ions may be reduced at the cathode 124 to regenerate the ferrous ions that are used to reduce the metals of the active material 126, according to Equation (4) below:

$$Fe^{3+}(aq) + e^-(aq) \rightarrow Fe^{2+}(aq);$$    (Equation 4).

Accordingly, in some embodiments, the ferrous ions are regenerated within the cathode chamber 120 and are not substantially consumed by the electrochemical cell 100. By way of comparison, conventional methods of recovering metals from lithium-ion batteries require dissolving the metals in an acid to dissolve the metals and recovering the metals from the acid. Dissolution of the metals may require significant amounts of one or more reducing agents, which reducing agents are generally consumed during the process. Such methods often require significant amounts of make-up acid and reducing agent to maintain a desired strength of the acid and continue to dissolve metals from the lithium-ion battery materials. Since the electrolyte 122 includes ferric ions that are regenerated within the cathode chamber 120, the method does not require significant amounts of makeup materials (e.g., reducing agents ($Fe^{2+}$)) to continue the dissolution of the metals from the active materials 126.

In use and operation, a potential is applied between the cathode 124 and a reference electrode (e.g., a silver chloride reference electrode, a stainless steel reference electrode). The reference electrode may be located in the anode chamber 110, for example. In other embodiments, the reference electrode may be located in the cathode chamber 120. Metals from the active material 126 are reduced by interaction with ferrous ions in the electrolyte 122 to dissolve such metals into the electrolyte 122, according to the simplified Equation below:

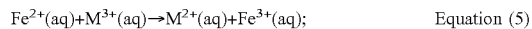
$$Fe^{2+}(aq) + M^{3+}(aq) \rightarrow M^{2+}(aq) + Fe^{3+}(aq);$$    Equation (5)

wherein M is one or more of Ni, Mn, Co, or Al.

The membrane 130 may facilitate formation of hydroxide ions and hydrogen ions according to Equation (6) below:

$$4H_2O \rightarrow 4OH^- + 4H^+;$$    Equation (6).

After the metals are dissolved from the active materials 126 into the electrolyte 122, the metals may be selectively recovered from the electrolyte 122. The cathode chamber 120 may be in fluid communication with one or more metal recovery processes that may be formulated and configured to recover the dissolved metals from the electrolyte 122. After the dissolved metals are recovered, the electrolyte 122 may be recycled back to the cathode chamber 120 and the process may continue.

Accordingly, in some embodiments, metals from the active materials 126 may be recovered using ferric ions. By way of comparison, in conventional metal recovery processes, ferrous ions and ferric ions are considered to be contaminants and are removed from solutions including dissolved metals from active material metals. The ferrous and ferric ions are used in the electrochemical cell 100 to reduce consumption of chemicals since they are regenerated during operation of the electrochemical cell 100. In other words, since the ferrous ions are regenerated by the cathode 124, significant quantities of a reducing agent are not required to disproportionate the metals of the active material 126.

Figure 1B:
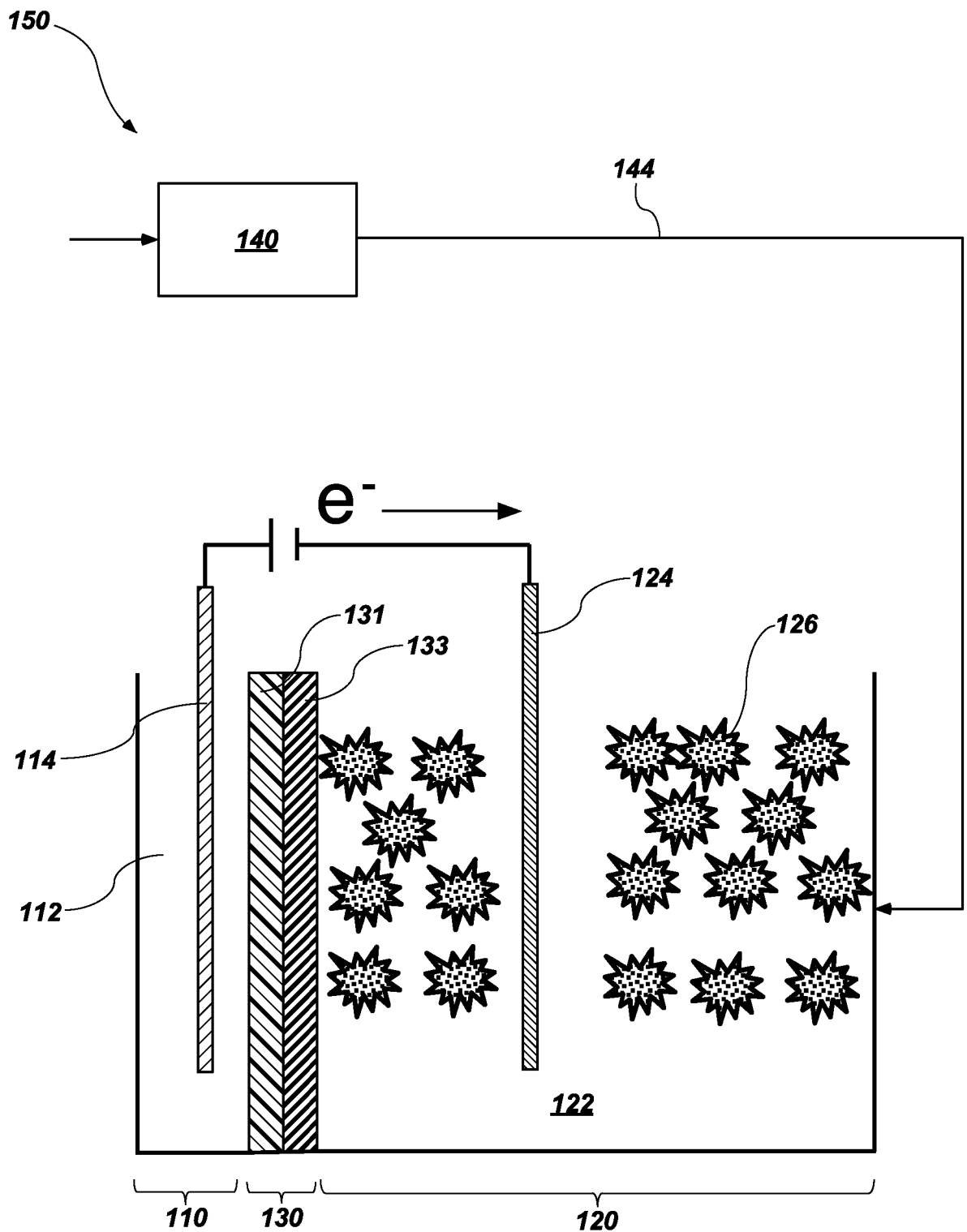
FIG. 1B is a simplified schematic of a system for removing active materials from rechargeable batteries, in accordance with other embodiments of the disclosure.

In some embodiments, the electrolyte 122 may be generated with an organism that metabolically generates one or more organic acids (e.g., one or more of gluconic acid, xylonic acid, citric acid, succinic acid, and acetic acid). The organic acid (e.g., gluconic acid) generated by the organism may be introduced (e.g., fed) to the electrochemical cell 100, such as to the cathode chamber 120 of the electrochemical cell 100. FIG. 1B is a simplified schematic of a system 150 for recovering metals from active battery materials, in accordance with embodiments of the disclosure.

With reference to FIG. 1B, the system 150 may include the electrochemical cell 100 of FIG. 1A. The system 150 may include a vessel 140 in fluid communication with the electrochemical cell 100. The vessel 140 may include, for example, a bioreactor, such as a continuous stirred-tank reactor (CSTR). The vessel 140 may be in fluid communication with a feed material 142 and may generate an acid 144 that may be in fluid communication with the electrochemical cell 100. The acid may also be referred to herein as a lixiviant or a biolixiviant.

The vessel 140 may include one or more organisms configured to generate the acid 144. The organisms may comprise bacteria that generate the acid 144 metabolically. By way of nonlimiting example, the organisms may comprise one or more of *Gluconobacter oxydans*, *Aspergillus niger*, and *Ceriporiopsis subvermispora*. In some embodiments, the *Gluconobacter oxydans* comprises a NRRL B 58 strain bacteria and produces gluconic acid. In some embodiments, the *Aspergillus niger* comprises a NRRL326 strain bacteria and produces at least citric acid. In some embodiments, *Ceriporiopsis subvermispora* produces at least succinic acid. The acid 144 may comprise one or more organic acids (e.g., one or more of gluconic acid, xylonic acid, citric acid, succinic acid, and acetic acid). In some embodiments, the acid 144 has a pH within a range from about 2.0 to about 3.0, such as from about 2.0 to about 2.5 or from about 2.5 to about 3.0.

The feed material 142 may include one or more materials that may be used by the organisms in the vessel 140 to metabolically generate the acid 144. In some embodiments, the feed material 142 includes one or both of glucose or corn stover (e.g., the leaves stacks, and cobs of corn).

The acid 144 may be provided to the electrochemical cell 100. In some embodiments, the acid 144 is provided to the cathode chamber 120 of the electrochemical cell 100. In some embodiments, the acid 144 is generated based on the amount of acid 144 required by the electrochemical cell 100 to dissolve the metals of the active material 126.

Figure 1C:
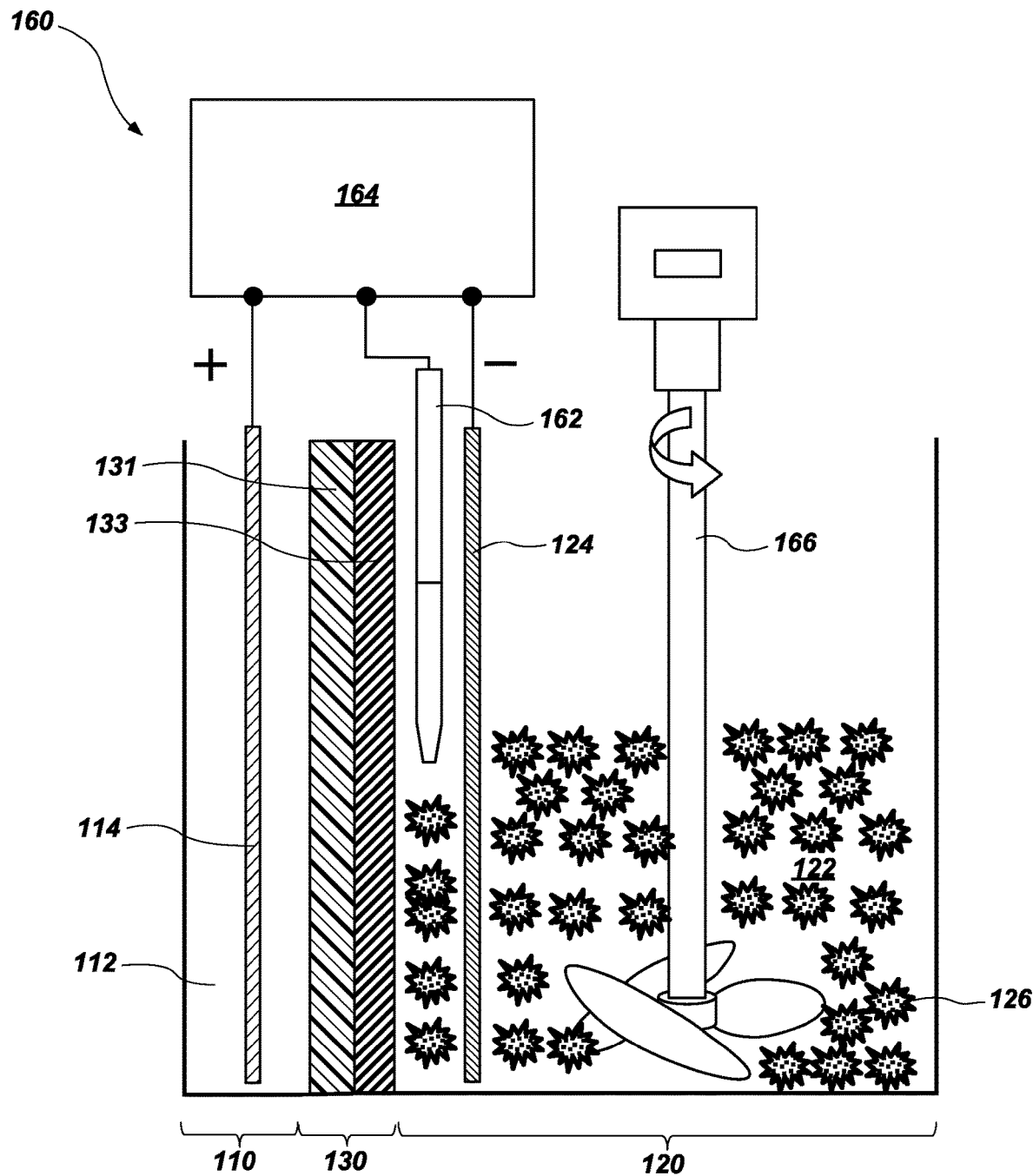
FIG. 1C is a simplified schematic of an electrochemical cell for removing active materials from rechargeable batteries, in accordance with other embodiments of the disclosure.

Although FIG. 1A and FIG. 1B have been described and illustrated as including the electrochemical cell 100 having a particular structure, the disclosure is not so limited. FIG. 1C is a simplified schematic of an electrochemical cell 160 for removing active materials from rechargeable batteries, in accordance with other embodiments of the disclosure. The electrochemical cell 160 may be substantially similar to the electrochemical cell 100 of FIG. 1A, except that the electrochemical cell 160 may include a reference electrode 162 in the cathode chamber 120. Each of the reference electrode 162, the anode 114, and the cathode 124 may be coupled to a potentiostat 164 configured to control a voltage difference between the reference electrode 162 and one of the anode 114 and the cathode 124. The electrochemical cell 160 may further include a mixer 166 configured to combine (e.g., mix, stir) the electrolyte 122. Although FIG. 1C illustrates that the mixer 166 comprises a blades, in other embodiments, the mixer 166 comprises a magnetic stirrer (e.g., a stir magnet).

Figure 2:
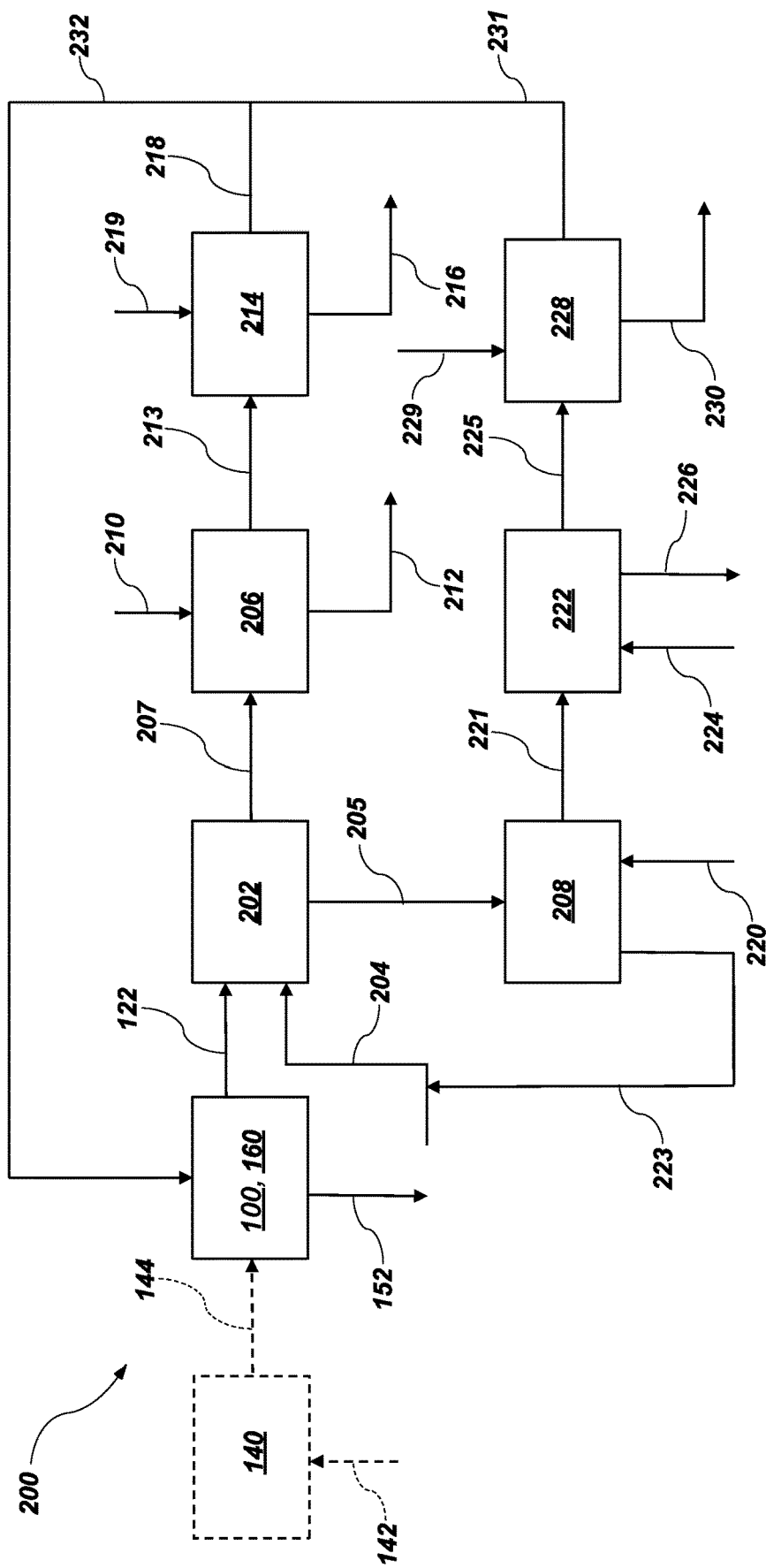
FIG. 2 is a simplified flow diagram of a system for recovering metals from active materials, in accordance with embodiments of the disclosure.

FIG. 2 is a simplified flow diagram of a system 200 for recovering metals from active materials 126 (FIG. 1A, FIG. 1B), in accordance with embodiments of the disclosure. The system 200 includes the electrochemical cell 100 of FIG. 1A and FIG. 1B or the electrochemical cell 160 of FIG. 1C, which is in fluid communication with a liquid-liquid extraction cell 202. In some embodiments, such as embodiments described with reference to FIG. 1B, the electrochemical cell 100, 160 may be in fluid communication with the vessel 140. The acid 144 may flow from the vessel 140 to the electrochemical cell 100, 160. In some such embodiments, the feed material 142 may be provided to the vessel 140. In some embodiments, a material 152 may exit the electrochemical cell 100, 160. The material 152 may include graphite and other components located within the active material 126 (FIG. 1A, FIG. 1B) that are not dissolved by the electrolyte 122.

The liquid-liquid extraction cell 202 may be in fluid communication with a solvent 204, which may be mixed with the electrolyte 122 in the liquid-liquid extraction cell 202. In some embodiments, the solvent 204 comprises an organic solvent. In some embodiments, the pH of liquid-liquid extraction cell 202 may be maintained within a range from about 3.0 to about 6.0.

The solvent 204 may contact the electrolyte 122 in the liquid-liquid extraction cell 202. The solvent 204 may be substantially immiscible with the electrolyte 122 but may absorb at least some of the metals dissolved in the electrolyte 122. In other words, at least some of the metals dissolved in the electrolyte 122 may be more soluble in the solvent 204 than in the aqueous solution of the electrolyte 122. Accordingly, a loaded solvent 205 including one or more metals absorbed from the electrolyte 122 may be formed in the liquid-liquid extraction cell 202. An aqueous solution 207 exiting the liquid-liquid extraction cell 202 may comprise the solution of the electrolyte 122 including one or more dissolved metals therein (e.g., metals that are not dissolved in the loaded solvent 205).

The loaded solvent 205 may include, for example, one or both of cobalt and manganese, which may be absorbed from the electrolyte 122 into the solvent 204 in the liquid-liquid extraction cell 202. Accordingly, the one or both of the cobalt and manganese may be substantially removed from the electrolyte 122 and absorbed by the solvent of the loaded solvent 205. In some embodiments, one or more of dissolved lithium and dissolved nickel remain in the electrolyte 122 and are not substantially absorbed by the solvent 204 in the liquid-liquid extraction cell 202. The one or more of dissolved lithium and dissolved nickel may remain in the aqueous solution 207.

The solvent 204 may include one or more materials formulated and configured to selectively absorb at least one of the metals dissolved in the electrolyte 122. By way of nonlimiting example, the solvent 204 may include thenoyltrifluoroacetone (TTA), a dialkyl phosphinic acid extractant (such as CYANEX®, commercially available from Solvay of Houston, Texas). In some embodiments, the solvent 204 comprises thenoyltrifluoroacetone. In other embodiments, the solvent 204 comprises a dialkyl phosphinic acid extractant, an alkane (e.g., kerosene, isoparaffinic hydrocarbons (such as ISOPAR™ series materials commercially available from Brenntag of the United Kingdom), branched or linear alkanes having from about 5 carbon atoms to about 20 carbon atoms (C5-C20 alkanes), halogen-containing alkanes (e.g., branched or linear alkanes having from about 5 carbon atoms to about 20 carbon atoms and including at least one halogen atom)), unsaturated alkenes, aromatics (e.g., toluene, xylenes), halogen-containing aromatics, ethers, esters, and sulfones. In other embodiments, such as where the solvent 204 includes thenoyltrifluoroacetone, the solvent 204 may further include an alcohol.

By way of nonlimiting example, where the active material 126 (FIG. 1A, FIG. 1B, FIG. 1C) comprises $LiCoO_2$, lithium may remain in the aqueous solution 207 while cobalt is substantially removed from the electrolyte 122 and absorbed in the loaded solvent 205. In embodiments where the active material 126 comprises $LiMn_2O_3$, lithium may remain in the aqueous solution 207 while manganese is substantially removed from the aqueous solution 207 and absorbed in the loaded solvent 205. In embodiments where the active material 126 comprises $LiNi_xCo_yMn_zO_2$, the lithium and nickel may remain in the aqueous solution 207, while cobalt and manganese are substantially removed from the aqueous solution 207 and absorbed in the loaded solvent 205. Where the active material 126 comprises $LiNiO_2$, the system 200 may not include the liquid-liquid extraction cell 202 and may include a component for separating the lithium from the nickel, as will be described herein.

With continued reference to FIG. 2, the aqueous solution 207 may exit the liquid-liquid extraction cell 202 and enter a nickel separation vessel 206 while the loaded solvent 205 exits the liquid-liquid extraction cell 202 and enters a second separation vessel 208. The nickel separation vessel 206 may be configured to separate, for example, nickel from lithium in embodiments where the aqueous solution 207 includes both nickel and lithium. In other embodiments, such as where the aqueous solution 207 does not include dissolved nickel, the system 200 may not include the nickel separation vessel 206.

A nickel separation agent 210 may be added to the aqueous solution 207 in the second separation vessel 208. The nickel separation agent 210 may be formulated and configured to selectively interact (e.g., chemically react, bind to, etc.) with nickel dissolved in the aqueous solution 207 and substantially not interact with at least another metal dissolved in the aqueous solution 207. In some embodiments, addition of the nickel separation agent 210 to the nickel separation vessel 206 may from a nickel-containing material 212. The nickel separation agent 210 may include a precipitating agent, a chelating agent, or both. In some embodiments, the nickel separation agent 210 includes a precipitating agent formulated and configured to react with dissolved nickel in the aqueous solution 207 and form a nickel-containing material 212 comprising a solid precipitate. By way of nonlimiting example, the nickel separation agent 210 may comprise sodium carbonate ($Na_2CO_3$) and the nickel-containing material 212 may comprise nickel carbonate ($NiCO_3$). In other embodiments, the nickel separation agent 210 includes one or more chelating agents formulated and configured to interact with dissolved nickel in the aqueous solution 207. By way of nonlimiting example, the nickel separation agent 210 may include one or more of ethylenediamine, ethylenediaminetetraacetic acid (EDTA), or another chelating agent. The nickel from the nickel-containing material 212 may be removed as a solid, such as solid nickel.

Although the nickel separation vessel 206 has been described as being in fluid communication with the nickel separation agent 210, the disclosure is not so limited. In some embodiments, the nickel separation vessel 206 comprises an ion exchange resin formulated and configured to selectively adsorb the dissolved nickel from the aqueous solution 207. The adsorbed nickel in the nickel separation vessel 206 may be recovered by passing a stripping agent through the ion exchange resin.

With continued reference to FIG. 2, a lithium-containing aqueous solution 213 may exit the nickel separation vessel 206. The lithium-containing aqueous solution 213 may include an aqueous solution comprising the composition of the electrolyte 122 and including lithium dissolved therein. In some embodiments, the lithium-containing aqueous solution 213 further includes the ferric and ferrous ions that were dissolved in the electrolyte 122. The lithium-containing aqueous solution 213 may be flowed from the nickel separation vessel 206 to a lithium separation vessel 214.

In the lithium separation vessel 214, lithium dissolved in the lithium-containing aqueous solution 213 may be removed from the aqueous solution. For example, a lithium separation agent 219 may be added to the lithium-containing aqueous solution 213 in the lithium separation vessel 214 to form a lithium-containing material 216 and an aqueous solution 218 substantially free of dissolved active material 126 (FIG. 1A, FIG. 1B) metals. In some embodiments, the lithium separation agent 219 comprises a precipitating agent formulated and configured to precipitate lithium. In some embodiments, the lithium separation agent 219 comprises sodium carbonate and the lithium-containing material 216 comprises lithium carbonate ($Li_2CO_3$).

With continued reference to FIG. 2, the loaded solvent 205 may be flowed from the liquid-liquid extraction cell 202 to the second separation vessel 208. The second separation vessel 208 may be configured to facilitate removal of dissolved metals (e.g., cobalt, manganese, or both) from the loaded solvent 205 into an aqueous acid solution 220 to form regenerated solvent 223 and a loaded aqueous acid solution 221. The regenerated solvent 223 may be substantially free of dissolved metals in some embodiments. In some embodiments, the regenerated solvent 223 is protonated. The regenerated solvent 223 may be recycled and mixed with the solvent 204 or mixed directly into the liquid-liquid extraction cell 202.

The aqueous acid solution 220 may be formulated and configured to selectively remove one or both of cobalt and manganese from the loaded solvent 205. The aqueous acid solution 220 may comprise, for example, one or more of nitric acid, phosphoric acid, sulfuric acid, or hydrochloric acid.

The loaded aqueous acid solution 221 may include one or both of dissolved cobalt and dissolved manganese. The loaded aqueous acid solution 221 may be flowed to a manganese separation vessel 222 where the loaded aqueous acid solution 221 may be mixed with a manganese separation agent 224. The manganese separation agent 224 may be formulated and configured to selectively interact with the manganese in the loaded aqueous acid solution 221 to form a manganese-containing material 226 and a cobalt-containing aqueous solution 225.

The manganese separation agent 224 may not substantially interact with cobalt. The manganese separation agent 224 may include a precipitating agent, a chelating agent, or both. In some embodiments, the manganese separation agent 224 includes a precipitating agent formulated and configured to react with dissolved manganese in the loaded aqueous acid solution 221 and form a manganese-containing precipitate. By way of nonlimiting example, the precipitating agent may comprise sodium carbonate and the manganese-containing precipitate may comprise manganese carbonate ($MnCO_3$).

In other embodiments, the manganese separation agent 224 includes one or more chelating agents formulated and configured to interact with dissolved manganese in the loaded aqueous acid solution 221 to form the manganese-containing material 226. By way of nonlimiting example, the chelating agent may comprise para-aminosalicylic acid (PAS) or ethylenediamine disuccinic acid (EDDS), for example. However, the disclosure is not so limited and other chelating agents formulated and configured to chelate with manganese may be used. Manganese may be recovered from the manganese-containing material by conventional methods of removing manganese from a manganese-containing material.

In some embodiments, the manganese separation vessel 222 comprises an ion exchange resin. In some such embodiments, the loaded aqueous acid solution 221 is flowed through the ion exchange resin, which may be formulated and configured to selectively adsorb manganese from the loaded aqueous acid solution 221. The adsorbed manganese may be recovered from the loaded ion exchange resin by passing a stripping agent through the ion exchange resin.

With continued reference to FIG. 2, the cobalt-containing aqueous solution 225 may enter a cobalt separation vessel 228. A cobalt separation agent 229 may mix with the cobalt-containing aqueous solution 225 to form a cobalt-containing material 230 and an aqueous solution 231 substantially free of dissolved metals such as cobalt, manganese, nickel, and lithium. However, the aqueous solution 231 may include, for example, ferric ions and ferrous ions.

The cobalt separation agent 229 may include a material formulated and configured to interact with dissolved cobalt in the cobalt-containing aqueous solution 225. The cobalt separation agent 229 may include a precipitating agent, a chelating agent, or both. In some embodiments, the cobalt separation agent 229 comprises a precipitating agent such as an oxalate (e.g., ammonium oxalate ($(NH_4)_2C_2O_4$)), a hydroxide (e.g., sodium hydroxide (NaOH)), or another precipitating agent. In some such embodiments, the cobalt-containing material 230 may comprise, for example, cobalt oxalate ($Co(C_2O_4)$, also written as $CoC_2O_4*2H2O$) or cobalt hydroxide ($Co(OH)_2$).

In other embodiments, the cobalt separation agent 229 comprises a chelating agent. By way of nonlimiting example, the chelating agent may include one or more of ethylenediaminetetraacetic acid, dimercaptosuccinic acid (DMFS), or another chelating agent. However, the disclosure is not so limited and other chelating agents formulated and configured to chelate with cobalt may be used.

In some embodiments, the cobalt separation vessel 228 comprises an ion exchange resin. In some such embodiments, the cobalt-containing material 230 is flowed through the ion exchange resin, which may be formulated and configured to selectively adsorb cobalt from the cobalt-containing material 230. The adsorbed cobalt may be recovered from the loaded ion exchange resin by passing a stripping agent through the ion exchange resin.

Although FIG. 2 has been illustrated and described as including the cobalt separation vessel 228 configured to receive the cobalt separation agent 229 and form the cobalt-containing material 230, the disclosure is not so limited. In some embodiments, the cobalt separation vessel 228 comprises an ion exchange column. In some such embodiments, the cobalt-containing aqueous solution 225 may be fed to the ion exchange column, which may include one or more materials (e.g., resins) formulated and configured to selectively remove (e.g., strip) dissolved cobalt from the cobalt-containing aqueous solution 225 and form the aqueous solution 231.

Referring again to FIG. 2, the aqueous solution 231 may be mixed with the aqueous solution 218 to form a recycle solution 232. The recycle solution 232 may comprise the same acid as found in the electrolyte 122. The recycle solution 232 may be recycled to the electrochemical cell 100 and reused in the process of dissolution of metals from the active material 126 (FIG. 1A, FIG. 1B) in the cathode chamber 120 (FIG. 1A, FIG. 1B).

Accordingly, the system 200 and electrochemical cell 100, 160 may be used for dissolving metals within active battery materials in an electrolyte, and for selectively recovering the dissolved metals from the electrolyte. The system 200 does not require significant acid strengths or significant amounts of makeup reducing agents since the metals are removed from the active materials 126 (FIG. 1A, FIG. 1B, FIG. 1C) in the electrochemical cell 100, 160 with ferrous ions that are regenerated within the cathode chamber 120 (FIG. 1A, FIG. 1B, FIG. 1C) of the electrochemical cell 100, 160. In some embodiments, the electrolyte 122 may be continuously generated from a renewable source, such as from the bacteria in the vessel 140. In some such embodiments, the electrolyte 122 may include an organic acid that may reduce the environmental impact of the acid of the electrolyte 122 relative to where the electrolyte 122 includes, for example, mineral acids such as sulfuric acid, hydrochloric acid, phosphoric acid, or nitric acid.

Although FIG. 2 has been described and illustrated as comprising a particular system 200 for recovering the dissolved metals from the electrolyte 122, the disclosure is not so limited. In other embodiments, the electrolyte 122 including the dissolved metals (e.g., one or more of dissolved lithium, nickel, cobalt, and manganese) may be flowed through a first ion exchange resin cell comprising a first ion exchange resin formulated and configured to selectively adsorb nickel, cobalt, and manganese. In some such embodiments, the electrolyte 122 may pass through the ion exchange resin bed and may include dissolved lithium. The lithium remaining in the electrolyte 122 may be recovered by passing the electrolyte 122 through a second ion exchange resin cell including an ion exchange resin formulated and configured to adsorb lithium. In other embodiments, the lithium may be recovered by contacting the electrolyte 122 with a lithium separation agent (e.g., the lithium separation agent 219). The nickel, cobalt, and manganese adsorbed on the first ion exchange resin may be recovered by, for example, passing, over the first ion exchange resin, a first extractant formulated and configured to selectively absorb at least one of the nickel, cobalt, and manganese from the ion exchange resin. A second extractant may be passed over the first ion exchange resin to selectively absorb another of the nickel, cobalt, and manganese from the first ion exchange resin. A third extractant may be passed over the first ion exchange resin to selectively absorb the remaining of the nickel, cobalt, and manganese from the first ion exchange resin. In other embodiments, the adsorbed nickel, cobalt, and manganese may be removed from the first ion exchange resin with an extractant and may be recovered from solution, such as with one or more of a nickel separation agent, a manganese separation agent, and a cobalt separation agent.

EXAMPLE 24.0 grams of an active battery material was placed in an electrochemical cell such as the electrochemical cell 100 of FIG. 1A. The active battery material had a chemical composition illustrated in Table I below when placed in the electrochemical cell.

TABLE I

| Component | Weight Percent (%) |
| --- | --- |
| Li | 2.31 |
| Co | 14.16 |

TABLE I-continued

| Component | Weight Percent (%) |
|---|---|
| Ni | 4.27 |
| Mn | 3.31 |
| Fe | 0.16 |
| Cu | 0.16 |
| Zn | 0.09 |
| Sn | 0.17 |
| Al | 0.48 |

With reference to Table I, the remaining composition of the active battery material was carbon in the form of graphite. The active battery material was placed in 200 ml of a 1.0 M sulfuric acid solution to form an electrolyte. Iron sulfate was added to the electrolyte to a concentration of about 0.01 M. A current was applied between the anode and the cathode of the electrochemical cell so that metals of the active battery material were dissolved. An elemental analysis of the remaining active battery material is shown in Table II. Over 98% of the nickel, cobalt, and manganese were dissolved from the active battery material.

TABLE II

| Component | Extraction Efficiency (%) |
|---|---|
| Li | 99% |
| Co | 98% |
| Ni | 99% |
| Mn | 99% |
| Fe | 48% |
| Cu | 80% |
| Zn | 76% |
| Sn | — |
| Al | 82% |

Non-limiting example embodiments of the disclosure are described below.

Embodiment 1: A method of recovering active materials from a rechargeable battery, the method comprising: placing an active material of a rechargeable battery in a cathode chamber comprising a cathode of an electrochemical cell comprising the cathode chamber, an anode chamber comprising an anode, and a membrane separating the cathode chamber from the anode chamber; contacting the active material in the cathode chamber with an electrolyte comprising an acid, ferric ions, and ferrous ions; applying a potential between the anode and the cathode; and dissolving at least one of lithium and cobalt from the active material into the electrolyte.

Embodiment 2: The method of Embodiment 1, further comprising reducing ferrous ions to ferric ions at the cathode.

Embodiment 3: The method of Embodiment 1 or Embodiment 2, wherein contacting the active material in the cathode chamber with an electrolyte comprising an acid, ferric ions, and ferrous ions comprises contacting the lithium-ion battery material with an electrolyte having a concentration within a range from about 0.005 M to about 0.10 M.

Embodiment 4: The method of any one of Embodiments 1 through 3, wherein placing an active material of a rechargeable battery in a cathode chamber comprising a cathode of an electrochemical cell comprises placing the active material in an electrochemical cell comprising the anode chamber separated from the cathode chamber by a bipolar membrane.

Embodiment 5: The method of any one of Embodiments 1 through 4, further comprising generating water and electrons from hydroxide ions in the anode chamber.

Embodiment 6: The method of any one of Embodiments 1 through 5, wherein contacting the active material in the cathode chamber with an electrolyte comprising an acid, ferric ions, and ferrous ions comprises contacting the active material with an electrolyte comprising sulfuric acid.

Embodiment 7: The method of Embodiment 6, wherein contacting the active material with an electrolyte comprising sulfuric acid comprises contacting the active material with sulfuric acid having a within a range 0.5 M to about 5.0 M.

Embodiment 8: The method of any one of Embodiments 1 through 7, wherein applying a potential between the anode and the cathode comprises applying a potential within a range from about 1.0 V to about 5.0 V between the anode and the cathode.

Embodiment 9: The method of any one of Embodiments 1 through 8, wherein dissolving at least one of lithium and cobalt from the active material into the electrolyte comprises dissolving lithium and cobalt from the active material into the electrolyte.

Embodiment 10: The method of any one of Embodiments 1 through 9, wherein dissolving at least one of lithium and cobalt from the active material into the electrolyte further comprises dissolving at least one of manganese and nickel into the electrolyte.

Embodiment 11: The method of Embodiment 10, further comprising separating the at least one of nickel and lithium from the at least one of manganese and cobalt.

Embodiment 12: The method of Embodiment 11, wherein separating the at least one of nickel and lithium from the at least one of manganese and cobalt comprises contacting the electrolyte with an organic solvent to absorb the at least one of manganese and cobalt in the organic solvent.

Embodiment 13: The method of any one of Embodiments 1 through 12, further comprising one of: contacting the electrolyte with a nickel separation agent to form a nickel-containing material and separate the nickel from the lithium; or passing the electrolyte through an ion exchange resin formulated and configured to selectively adsorb at least one of the nickel, manganese, or cobalt from the electrolyte.

Embodiment 14: The method of any one of Embodiments 1 through 13, further comprising recycling the electrolyte to the electrochemical cell after removing substantially all of the at least one of lithium and cobalt from the electrolyte.

Embodiment 15: The method of any one of Embodiments 1 through 14, wherein contacting the active material in the cathode chamber with an electrolyte comprising an acid, ferric ions, and ferrous ions comprises contacting the active material with an electrolyte comprising at least one organic acid.

Embodiment 16: The method of Embodiment 15, further comprising forming, in a vessel, the at least one organic acid with an organism comprising one or more of *Gluconobacter oxydans*, *Aspergillus niger*, and *Ceriporiopsis subvermispora*.

Embodiment 17: The method of Embodiment 16, further comprising providing the at least one organic acid from the vessel to the electrochemical cell.

Embodiment 18: The method of Embodiment 16, wherein forming, in a vessel, the at least one organic acid comprises forming gluconic acid in the vessel.

Embodiment 19: An apparatus for recovering metals from active materials of rechargeable batteries, the apparatus comprising: an electrochemical cell comprising an anode, a cathode, a membrane between the anode and the cathode, and an electrolyte, the electrolyte comprising: an acid; ferric ions; ferrous ions; and an active material of a rechargeable battery; and a system for recovering at least one of lithium and cobalt from the electrolyte in operable communication with the electrochemical cell.

Embodiment 20: The apparatus of Embodiment 19, further comprising a vessel including bacteria that metabolically generates gluconic acid.

Embodiment 21: The apparatus of Embodiment 19 or Embodiment 20, wherein the vessel is in fluid communication with the electrochemical cell.

While embodiments of the disclosure may be susceptible to various modifications and alternative forms, specific embodiments have been shown by way of example in the drawings and have been described in detail herein. However, it should be understood that the disclosure is not limited to the particular forms disclosed. Rather, the disclosure encompasses all modifications, variations, combinations, and alternatives falling within the scope of the disclosure as defined by the following accompanying claims and their legal equivalents.

What is claimed is:

1. A method of recovering active materials from a rechargeable battery, the method comprising:
    placing an active material of a rechargeable battery in a cathode chamber comprising a cathode of an electrochemical cell comprising the cathode chamber, an anode chamber comprising an anode, and a membrane separating the cathode chamber from the anode chamber;
    contacting the active material in the cathode chamber with an electrolyte comprising an acid, ferric ions, and ferrous ions;
    applying a potential between the anode and the cathode; and
    dissolving at least one of lithium and cobalt from the active material into the electrolyte.

2. The method of claim 1, further comprising reducing ferric ions to ferrous ions at the cathode.

3. The method of claim 1, wherein contacting the active material in the cathode chamber with an electrolyte comprising an acid, ferric ions, and ferrous ions comprises contacting a lithium-ion battery material with an electrolyte having a concentration within a range from about 0.005 M to about 0.10 M.

4. The method of claim 1, wherein placing an active material of a rechargeable battery in a cathode chamber comprising a cathode of an electrochemical cell comprises placing the active material in an electrochemical cell comprising the anode chamber separated from the cathode chamber by a bipolar membrane.

5. The method of claim 1, further comprising generating water and electrons from hydroxide ions in the anode chamber.

6. The method of claim 1, wherein contacting the active material in the cathode chamber with an electrolyte comprising an acid, ferric ions, and ferrous ions comprises contacting the active material with an electrolyte comprising sulfuric acid.

7. The method of claim 6, wherein contacting the active material with an electrolyte comprising sulfuric acid comprises contacting the active material with sulfuric acid having a concentration within a range of from about 0.5 M to about 5.0 M.

8. The method of claim 1, wherein applying a potential between the anode and the cathode comprises applying a potential within a range from about 1.0 V to about 5.0 V between the anode and the cathode.

9. The method of claim 1, wherein dissolving at least one of lithium and cobalt from the active material into the electrolyte comprises dissolving lithium and cobalt from the active material into the electrolyte.

10. The method of claim 1, wherein dissolving at least one of lithium and cobalt from the active material into the electrolyte further comprises dissolving at least one of manganese and nickel into the electrolyte.

11. The method of claim 10, further comprising separating at least one of nickel and lithium from at least one of manganese and cobalt.

12. The method of claim 11, wherein separating at least one of nickel and lithium from at least one of manganese and cobalt comprises contacting the electrolyte with an organic solvent to absorb the at least one of manganese and cobalt in the organic solvent.

13. The method of claim 11, further comprising one of:
    contacting the electrolyte with a nickel separation agent to form a nickel-containing material and separate the nickel from the lithium; or
    passing the electrolyte through an ion exchange resin formulated and configured to selectively adsorb at least one of nickel, manganese, or cobalt from the electrolyte.

14. The method of claim 1, further comprising recycling the electrolyte to the electrochemical cell after removing substantially all of the at least one of lithium and cobalt from the electrolyte.

15. The method of claim 1, wherein contacting the active material in the cathode chamber with an electrolyte comprising an acid, ferric ions, and ferrous ions comprises contacting the active material with an electrolyte comprising at least one organic acid.

16. The method of claim 15, further comprising forming, in a vessel, the at least one organic acid with an organism comprising one or more of *Gluconobacter oxydans*, *Aspergillus niger*, and *Ceriporiopsis subvermispora*.

17. The method of claim 16, further comprising providing the at least one organic acid from the vessel to the electrochemical cell.

18. The method of claim 16, wherein forming, in a vessel, the at least one organic acid comprises forming gluconic acid in the vessel.

19. An apparatus for recovering metals from active materials of rechargeable batteries, the apparatus comprising:
    an electrochemical cell comprising an anode, a cathode, a membrane between the anode and the cathode, and an electrolyte, the electrolyte comprising:
        an acid;
        ferric ions;
        ferrous ions; and
        an active material of a rechargeable battery; and
    a system for recovering at least one of lithium and cobalt from the electrolyte in operable communication with the electrochemical cell.

20. The apparatus of claim 19, wherein the acid comprises gluconic acid, the apparatus further comprising a vessel including bacteria that metabolically generates the gluconic acid.

21. The apparatus of claim 20, wherein the vessel is in fluid communication with the electrochemical cell.

* * * * *